United States Patent

[11] 3,624,250

| [72] | Inventor | Dana Peter Carlson |
| --- | --- | --- |
| | | Wilmington, Del. |
| [21] | Appl. No. | 4,394 |
| [22] | Filed | Jan. 20, 1970 |
| [45] | Patented | Nov. 30, 1971 |
| [73] | Assignee | E. I. du Pont de Nemours and Company |
| | | Wilmington, Del. |
| | | Continuation-in-part of application Ser. No. 777,166, Nov. 19, 1968, now abandoned, Continuation-in-part of application Ser. No. 853,923, Aug. 28, 1969, now abandoned. This application Jan. 20, 1970, Ser. No. 4,394 |

[54] COPOLYMERS OF ETHYLENE/TETRAFLUOROETHYLENE AND OF ETHYLENE/CHLOROTRIFLUOROETHYLENE
21 Claims, No Drawings

[52] U.S. Cl. .................................................. 260/80.75, 260/80.6, 260/80.76, 260/80.77, 117/128.4
[51] Int. Cl. ................................................................ C08f 15/40
[50] Field of Search ............................................ 260/41 A, 80.75, 80.76, 80.77, 80.81, 80.6

[56] References Cited

UNITED STATES PATENTS

| 2,392,378 | 1/1946 | Hanford ....................... | 26/80 |
| --- | --- | --- | --- |
| 2,468,664 | 4/1949 | Hanford et al. ............... | 260/87.5 |
| 3,235,537 | 2/1966 | Albin et al. ................... | 260/80.76 |
| 3,303,154 | 2/1967 | Hirose et al. .................. | 260/29.6 |
| 3,444,148 | 5/1969 | Adelman ....................... | 260/80.72 |
| 3,445,434 | 5/1969 | Stilmar ......................... | 260/80.71 |

Primary Examiner—Joseph L. Schofer
Assistant Examiner—Stanford M. Levin
Attorney—Edwin Tocker ABSTRACT: High temperature tensile properties of ethylene/tetrafluoroethylene copolymer are improved by incorporating therein a small amount of a third monomer component which is a copolymerizable vinyl monomer which is telogenically inactive and provides a side chain in the resultant copolymer, containing at least two carbon atoms. In one embodiment, the elements in the side chain have only single bonds therebetween, and in another embodiment the side chain is an aromatic ring. The same effect is obtained for ethylene/chlorotrifluoroethylene copolymer. The resultant copolymers are especially useful as insulation coating for wire to be exposed to high temperature service.

COPOLYMERS OF ETHYLENE/TETRAFLUOROETHYLENE AND OF ETHYLENE/CHLOROTRIFLUOROETHYLENE

This application is a continuation-in-part of application Ser. No. 853,923, filed Aug. 28, 1969, which, in turn, is a continuation-in-part of application Ser. No. 777,166, filed Nov. 19, 1968 by the same inventor, both applications now abandoned.

This invention relates to ethylene/tetrafluoroethylene copolymer, and to ethylene/chlorotrifluoroethylene copolymer, and more particularly to such copolymers having improved high temperature tensile properties.

Ethylene/tetrafluoroethylene copolymer (mole ratio of about 1:1) is potentially useful at high temperatures because of its high melting point of about 275° C. Unfortunately, however, the tensile properties of the copolymer deteriorate well below the melting point so as to prevent the copolymer from being useful at temperatures up to its high melting point in many applications. For example, a wire coating of the copolymer becomes brittle at 200° C. and cracks at low stress. The ultimate elongation of the copolymer which is in excess of 300 percent at room temperature is usually less than 20 percent at 200° C.

Copolymers of ethylene/chlorotrifuoroethylene are disclosed in U.S. Pat. No. 2,392,378 to Hanford, but such copolymers melt at temperatures below 200° C. A procedure for preparing higher melting copolymers of these monomers is disclosed in European Polymers Journal, Vol. 3, pages 129–144 (1967), but even these higher melting copolymers cannot be used at high temperature application since they suffer from the same disadvantage as the ethylene/tetrafluororethylene copolymers. For example, a 1:1 mole ratio copolymer of ethylene/chlorotrifluoroethylene melting at 235° C. has an ultimate elongation of greater than 150 percent at room temperature but has an ultimate elongation of less than 32 percent at 200° C., making such copolymers useless as a wire coating intended for service at 200° C.

The present invention provides ethylene/tetrafluoroethylene copolymer compositions and ethylene/chlorotrifluoroethylene copolymer compositions having improved high temperature mechanical, especially tensile, properties. The copolymers of this invention comprise from 40 to 60 mole percent ethylene, 40 to 60 mole percent of tetrafluoroethylene or chlorotrifluoroethylene and an adjuvant amount of a copolymerizable vinyl monomer which is free of telogenic activity and which incorporates into the copolymer a side chain containing at least two carbon atoms, with the side chain having only single bonds between elements or consisting essentially of an aromatic ring.

By "copolymerizable" is meant that the vinyl monomer must be able to form an integral part of the main copolymer chain through the vinyl group of the vinyl monomer. Thus, the vinyl monomer must also not act as an inhibitor to prevent the copolymerization reaction from occurring.

By "free of telogenic activity" is meant that the vinyl monomer does not act as a chain transfer agent to an extent which undesirably limits the molecular weight of the copolymer. Generally, for the tetrafluoroethylene-containing copolymers of this invention, a molecular weight corresponding to a melt viscosity of at least $5 \times 10^3$ poises at 300° C. measured at a shear stress of 0.455 kg./cm.2 is desirable in order for the copolymer to have acceptable tensile properties. These copolymers should have a melt viscosity of less than $5 \times 10^6$ poises measured under the same conditions in order to be melt-fabricable. The same melt viscosity parameters apply to the chlorotrifluoroethylene copolymers of this invention except that the melt viscosity is determined at 260° C.

The requirement that the vinyl monomer have a side chain having at least two carbon atoms is another way of describing the minimum bulk of the side chain. When the side chain has this minimum bulk, improvement in high temperature tensile properties is obtained, and when the side chain does not have this minimum bulk, no improvement is realized. It is believed that the manner in which poly(ethylene/tetrafluoroethylene) and poly(ethylene/chlorotrifluoroethylene) crystallize from the molten state leads to the deficiency in tensile properties at high temperatures. The bulky side chain provided by the vinyl monomer interferes with this manner of crystallization as indicated by the improved clarity of film made from copolymer of the present invention. The side chain of the vinyl monomers useful in the present invention can further be defined as having single bonds only between elements in the said chain or as consisting essentially of an aromatic nucleus. Typically the vinyl group of the vinyl monomer will be fluorocarbon or hydrocarbon.

With these criteria for selection of the vinyl monomer set forth, numerous such monomers will suggest themselves to one skilled in the art, as being applicable in the present invention. Examples of such vinyl monomers are the fluorinated vinyl monomers represented by the formulas $$R-CF=CF_2 \quad \text{and} \quad ROCF=CF_2$$

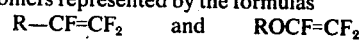

wherein R is an organic group which can be cyclic, acyclic and/or contain an aromatic nucleus and which contains from 2 to 8 carbon atoms. Generally, the organic group will be highly fluorinated, i.e., at least one fluorine atom substituted on each carbon atom. However, other atoms can be present such as chlorine as monosubstituents on a carbon atom. Hydrogen can also be present in the groups in a position where it is essentially inert, such as the omega position as part of the group of $-CF_2H$ or as part of the group $-CH_3$. Similarly, other atoms such as S and N can be present in an inert moiety Representative fluorinated vinyl monomers that can be used include the fluorinated α-monoolefins such as perfluorobutene-1, perfluoropentene-1, perfluoroheptene-1, and omega-hydroperfluoroocetene-1 and the fluorinated vinyl ethers represented by the formula $XCF_2(CF_2)_nOCF=CF_2$ wherein X is F, H or Cl and n is an integer of 1 to 7. Examples of such vinyl ethers include perfluoro(ethyl vinyl ether), perfluoro(propyl vinyl ether), and 3-hydroperfluoro(propyl vinyl ether). Another fluorinated vinyl ether that can be used is perfluoro(2-methylene-4-methyl-1,3-dioxolane) which is described in U.S. Pat. No. 3,308,107 to Selman and Squire.

The organic (R) group need not be highly fluorinated where some sacrifice in thermal stability of the resulting copolymer can be tolerated. Examples of monomers not highly fluorinated and useful in the present invention include the hydrofluorocarbon fluorinated vinyl monomers and hydrocarbon fluorinated vinyl monomers, such as of the formulas $CF_3(CF_2)_m CH_2OCF=CF_2$, where m is an integer of 0 to 6 and $CH_3(CH_2)_BnOCF=CF_2$, where n is an integer of 1 to 7, respectively. These vinyl ethers are made by reacting the respective sodium alcoholate with tetrafluoroethylene under conditions disclosed in U.S. Pat. No. 3,159,609. Examples of these vinyl ethers includes n-butyl trifluorovinyl ether and 2,2,3,3,3-pentafluoropropyl trifluorovinyl ether.

Examples of vinyl monomers in which the side chain is aromatic include perfluorostyrene, pentafluorostyrene, and α,β,β'-trifluorostyrene.

Additional vinyl monomers in which the vinyl group is hydrocarbon and which are useful in the present invention can be represented by the formulae

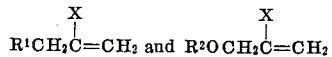

$$R^1CH_2\overset{X}{C}=CH_2 \quad \text{and} \quad R^2OCH_2\overset{X}{C}=CH_2$$

wherein $R^1$ and $R^2$ are perfluorinated or chloro-fluoroalkyl groups of 1 to 7 carbon atoms and X is H or $CH_3$. The simplest of these vinyl monomers are prepared by reacting hexafluoroacetone with propylene in the presence of $AlCl_3$ and hexafluoroacetone with allyl bromide in the presence of CsF, respectively. Further description of vinyl monomers of these formulae and process for making them is provided in Knunyants, Bull. Acad. Sci., USSR, Div. Chem. Sci, 355 (1962) and Dutch Pat. No. 6,602,167. Typical $R^1$ and $R^2$ groups for these monomers include the perfluoroalkyls such as $CF_3CF_3CF_2-$, and $(CF_3)_2CF-$ and the chlorofluoroalkyls such as $(CClF_2)_2CF$. $R^1$ can also be a secondary or tertiary halo-alcohol such as of the group $—(CClF_2)_2HOG$, or $—(CF_3)_2COH$, such as described in U.S. Pat. No. 3,444,148. Examples of these vinyl monomers are as follows: 4,4,4-trifluorobutene-1; 4,4,5,5,5-pentafluoropentene-1; 1,1,1-trifluoro-2-(trifluoromethyl)-4-penten-2-ol; 1-chloro, 1,1-difluoro-2-(chlorodifluoromethyl-4-penten-2-ol; 1,1,1-trifluoro-2-(trifluoromethyl)-4-methyl-4-penten-2-ol; 4-(trifluoromethyl)-4,5,5,5-tetrafluoropentene-1; allyl heptafluoroisopropyl ether; allyl-1,3-dichloropentafluoroisopropyl ether; allyl heptafluoropropyl ether; allyl pentafluoroethyl ether and 2-methyl allyl heptafluoroisopropyl ether.

The amount of vinyl monomer required in the copolymer to obtain an adjuvant effect, i.e., improvements in tensile properties at high temperatures, e.g., 200° C., will depend on the particular vinyl monomer being used. Generally, the bulkier the side chain, the lower is the amount of vinyl monomer required for a given level of improvement. In terms of preferred result desired, the amount of vinyl monomer incorporated into the copolymer should enable the resultant copolymer, coated onto a wire, to be wrapped 180° around a 1.9 cm. mandrel and have a 0.908 kg. weight attached to each downwardly extending end of the wire and be maintained in this disposition at least 200° C. for at least 120 hours without cracking. This can be called passing the Mandrel Test. In contrast, both poly(ethylene/tetrafluoroethylene) and poly(ethylene/chlorotrifluoroethylene, subjected to the same test, crack at about 150° C. Generally, the level of vinyl monomer required to give an adjuvant effect is usually from 0.1 to 10 mole percent. Preferred amounts of vinyl monomer in the copolymer are from 1 to 6 mole percent. The mole percent of vinyl monomer is given in terms of the total number of moles of ethylene plus tetrafluoroethylene or chlorotrifluoroethylene in the copolymer.

With respect to the ethylene/tetrafluoroethylene or chlorotrifluoroethylene content of the copolymer, the ethylene content is from 40 to 60 mole percent and the tetrafluoroethylene or chlorotrifluoroethylene content is, complementary to total 100 mole percent, from 40 to 60 mole percent. When either more or less tetrafluoroethylene or chlorotrifluoroethylene is present, the tensile properties and cut-through resistance of the copolymer become undesirably low. Preferably, from 45 to 55 mole percent of each of these monomers is present in the copolymer. Generally, both the tetrafluoroethylene-containing and the chlorotrifluoroethylene-containing copolymers of this invention are composed essentially of ethylene units alternating with tetrafluoroethylene or chlorotrifluoroethylene units, respectively, in the polymer chain, with the vinyl monomer units being randomly interspersed among these units.

The preferred tetrafluoroethylene-containing copolymer when comprised solely of ethylene and tetrafluoroethylene (about 1:1 mole biases) has a melting point of about 275° C. This melting point is reduced to between 250° and 265° C. when as much as 3 mole percent (ethylene plus tetrafluoroethylene mole basis) of a vinyl monomer described hereinbefore is present in the copolymer. In the case of chlorotrifluoroethylene-containing copolymers of this invention, it is desired that the amount of vinyl monomer present in the terpolymer not reduce its melting point below 215° C., and preferably not below 225° C. The proportion of ethylene and chlorotrifluoroethylene should be such that if present without the third monomer, the melting point of the copolymer would be at least 230° C. Melting points given herein are determined by differential thermal analysis using the minimum point on the curve as the melting point (heating rate of 15° C. per min.).

Description of the copolymers of the present invention in terms of monomer content is intended to refer to the units making up the copolymer derived by copolymerization of the monomers.

The tetrafluoroethylene-containing copolymers of this invention can be prepared by the nonaqueous polymerization system disclosed in U.S. Pat. Ser. No. 679,162, filed 10/30/67 by Carlson (issued as German Pat. No. 1,806,097), which comprises bring the monomers together in a hydrochlorofluorocarbon solvent, at a temperature from 30° to 85° C. and in the presence of a polymerization initiator active at such temperature.

The chlorotrifluoroethylene-containing polymers of this invention are preferably prepared in a nonaqueous polymerization system by a process described in the aforementioned article in the European Polymer Journal. For the copolymer to having a melting point above 200° C., the polymerization temperature should be less than 20° C., and preferably less than 10° C. A good balance of properties (except for high temperature mechanical properties) is obtained at polymerization temperatures from −10 to +10° C.

The resultant copolymer of this invention can be used to fabricate articles such as sheets, rods, tubes by conventional melt fabrication techniques. Solution casting can be used also. The copolymer is particularly useful as a wire coating which may be exposed to high temperatures.

Various ingredients can be compounded with the copolymers of this invention to promote their usefulness in particular applications.

The following examples are intended to be illustrative of copolymers of the present invention and not as a limitation on the scope thereof. Parts and per cents are by weight unless otherwise indicated.

EXAMPLE I

Into an evacuated, agitated 1 liter stainless steel autoclave were placed 800 ml. of 1,1,2-trichloro-1,2,2,-trifluoroethane solvent, 4.0 ml. of cyclohexane and 28 grams of perfluoropropyl perfluorovinyl ether. The temperature of the mixture was raised to 60° C. and the agitator speed was set at about 500 r.p.m. To this mixture was charged tetrafluoroethylene (TFE) and ethylene in such a proportion to make the composition in the gas phase of the reactor 70 ± 1 mole percent tetrafluoroethylene at a total pressure of 6.3 kg./cm². To the autoclave was then charged 25 ml. of a solution of 0.001 g./ml. bisperfluoropropionyl peroxide in the aforementioned solvent. The pressure was kept constant as was the concentration of tetrafluoroethylene and ethylene by continuous addition of a mixture of the two monomers. After 10 minutes and every 10 minutes thereafter, an additional 7.5 ml. of the above peroxide solution was added. The polymerization was continued for a total of 70 minutes at the end of which time the contents of the clave were discharged into a large stainless steel beaker. The polymer was recovered by drying it in an air oven at 125° C. overnight. The dry polymer weighed 39.3 grams and had a melt viscosity at 300° C. of $73 \times 10^4$ poises. Analysis of the terpolymer showed that it contained 48.8 mole percent TFE, 48.8 mole percent ethylene, and 2.4 mole percent PPVE. The melting point of the terpolymer by differential thermal analysis was 255°. The MIT flex life of the terpolymer was 16,300.

EXAMPLE II

Example I was repeated except that only 2.0 ml. cyclohexane was added. The polymerization was allowed to proceed for 60 minutes. The dry polymer from this run weighed 34.8 grams and had a melt viscosity at 300° C. of $3.10 \times 10^4$ poises. Analysis of the terpolymer showed that it contained 49.3 mole percent TFE, 48.9 mole percent ethylene, and 2.7 mole percent PPVE. The melting point of this terpolymer was 257° C. and the MIT flex life was 28,500. Compression molded films had a tensile strength of 42.2 kg./cm.² and an ultimate elongation of 400 percent both when measured at 200° C.

A polymer similar to that above but not containing PPVE ($3.0 \times 10^4$ poises melt viscosity at 300° C. and 51.0 mole percent TFE) had a tensile strength of 40 kg./cm.², an ultimate elongation of 18 percent when measured at 200° C., a melting point of 277° C., and an MIT flex life of 12,200.

EXAMPLE III

Example I was repeated except that an equivalent amount (23 grams) of perfluoroethyl perfluorovinyl ether (PEVE) was charged in place of the PPVE. The polymerization proceeded for 60 The dry polymer from this run weighed 49.5 grams and had a melt viscosity at 300° C. of $3.6 \times 10^4$ poises. The melting point of this terpolymer was 262° C. The MIT flex life was 10,400. Compression molded films of the terpolymer had a tensile strength of 32.4 kg./cm.$^2$ and an ultimate elongation of 300 percent when measured at 200° C.

EXAMPLES IV THROUGH VIII

These examples were all carried out as described in example I, except that the amounts of PPVE and cyclohexane were varied. In each case the run time was 60 minutes. The results of these experiments are shown in table I.

EXAMPLE IX

The conditions in example I were repeated except that no cyclohexane was added and 50 grams of perfluoroheptene-1 was charged in place of the PPVE. At the end of the run (60 minutes), the product was discharged into a 1-gallon stainless steel cylinder. The solvent and unreacted perfluoroheptene-1 were flashed off from the polymer in a rotary dryer. The recovered solvent and perfluoroheptene-1 weighed 1,118 g. (perfluoroheptene-1 conc. = 49.5 g./l.). The dry polymer weighed 28.5 grams and had a melt viscosity of $400 \times 10^4$ poises at 300° C. The melting point of this terpolymer was 267° C.

When perfluorobutene-1 is substituted for perfluoroheptene-1 in this example, substantially the same results are obtained.

To illustrate the criticality in the bulkiness of the side chain provided by the vinyl monomer, when an equivalent amount of hexafluoropropene is used as the vinyl monomer, no improvement in tensile properties is obtained. Similarly, when an equivalent amount of perfluoro(methyl vinyl ether) is used as the vinyl monomer, no improvement is obtained. U.S. Pat. No. 3,303,154 to Hirose et al. discloses isobutylene as a termonomer in the formation of ethylene/tetrafluoroethylene copolymer. Replacement of the olefin of example IX by an equivalent amount of isobutylene does not give any improvement in high temperature mechanical properties In fact, the tensile strength of the terpolymer at high temperature becomes poorer.

EXAMPLE X

Example I was repeated except that 2.5 ml. of vinyl acetate was added in place of the PPVE and only 3 ml. of cyclohexane were added. The polymerization run was carried out for 60 minutes, and 55.4 g. of dry polymer with a melt viscosity of $28.6 \times 10^4$ poises at 300° C. was recovered. The infrared spectrum of a molded film of the polymer showed strong absorbance at 5.62 microns, which is indicative that vinyl acetate was incorporated into the polymer. The tensile strength and ultimate elongation of a compression molded film of the polymer at 200° C. were 34.8 kg./cm.$^2$ and 378 percent, respectively.

EXAMPLE XI

Four polymerizations (designated A to D) were conducted according to the following procedure; 800 ml. of 1,1,2-trichloro-1,2,2-trifluoroethane solvent was charged into an evacuated, agitated 1 liter stainless steel autoclave. With the solvent was charged the desired amounts of cyclohexane and 1,1,1-trifluoro-2-(trifluoromethyl)-4-penten-2-ol. The temperature of the mixture was raised to 60° C. and the agitator speed was set at 1,000 r.p.m. To the clave was then charged tetrafluoroethylene and ethylene at the desired ratio to a total pressure of 9.7 kg./cm.$^2$. To the autoclave was then charged 25 ml. of 0.001 g./ml. solution of bisperfluoropropionyl peroxide in the polymerization solvent. The pressure was kept constant as was the concentration of tetralfuoroethylene and ethylene by continuous addition of the two monomers. The initiator solution was added continuously during the run at a rate of 0.975 ml. min. in order to maintain the initiator concentration constant. The polymerization was continued for 60 minutes at the end of which time the clave contents were discharged into a large beaker. The polymers were recovered by drying in an air oven at 125° C. overnight and were tested for tensile strength and elongation at 200° C. The polymerization conditions including reactant amounts and test results are shown in table II. These experiments illustrate the beneficial effect of the third monomer on the high temperature tensile properties of the copolymer.

EXAMPLE XII

The procedure in example XII was repeated except that the third monomer added was 5 g. of allyl heptafluoroisopropyl ether and 5 ml. of cyclohexane were added to the solvent prior to charging to the autoclave. The concentration of tetrafluoroethylene was 68 mole percent (gas phase) in the tetrafluoroethylene-ethylene mixture. During the run time of 60 minutes, 59.8 grams of copolymer were obtained. The copolymer had a melt viscosity of $12.6 \times 10^4$ poises at 200° C. and a melting point of 258° C. (DTA peak). A compression molded film of the copolymer had a tensile strength of 53.5 kg./cm.$^2$ and ultimate elongation of 511 percent at 200° C.

EXAMPLE XIII

Example XII was repeated except that the third monomer added was 13 g. of 2,2,3,3,3-pentafluoropropyl trifluorovinyl ether and 4 ml. of cyclohexane were added to the solvent prior to charging to the autoclave. The concentration of tetrafluoroethylene was 73 mole percent (gas phase) in the tetrafluoroethylene-ethylene mixture. The dry polymer recovered from the run weighed 34.9 grams and had a melt viscosity of $0.9 \times 10^4$ poises at 300° C. The melting point of this polymer was 255° C. (DTA peak) and the tensile strength and ultimate elongation at 200° C. were 32.4 kg./cm.$^2$ and 216 percent, respectively.

EXAMPLE XIV

Example XII was repeated except that the third

TABLE I

| Example | PPVE, grams | Cyclo-hexane, ml. | Polymer weight, grams | Composition, mole percent | | | Melt viscosity (300) $\times 10^4$ poise | Melting point, °C. | Properties, tensile strength, kg./cm.$^2$ | 200° C. ultimate elongation percent |
|---------|-------------|-------------------|----------------------|---------------------------|---|---|-----------|-----------|-----------|-----------|
|         |             |                   |                      | TFE | Eth | PPVE |           |           |           |           |
| IV      | 14          | 4                 | 66.1                 | 49.1 | 49.8 | 1.1 | 2.2 | 267 | 37.8 | 98 |
| V       | 28          | 4                 | 54.5                 | 47.5 | 50.2 | 2.3 | 3.4 | 259 | 36.8 | 410 |
| VI      | 42          | 3                 | 77.1                 | 45.8 | 50.5 | 3.7 | 4.5 | 250 | 38.6 | 510 |
| VII     | 56          | 3                 | 80.5                 | 45.5 | 48.9 | 5.6 | 3.2 | 243 | 32.4 | 490 |
| VIII    | 70          | 2                 | 74.9                 | 44.8 | 48.8 | 6.4 | 5.5 | 235 | 26.6 | 470 |

TABLE II

| Polymerization | Termonomer, grams | Cyclohexane, milliliters | TFE, m percent (gas phase) | Polymer weight, grams | Melt viscosity ×10⁴ poise (300° C.) | Melting point, ° C. (DTA peak) | 200° C. Tensile strength, kg./cm.² | 200° C. Ultimate elongation, percent |
|---|---|---|---|---|---|---|---|---|
| A | 3 | 4 | 68 | 40.1 | 8.7 | 272 | 52 | 402 |
| B | 3 | 4 | 73 | 43.6 | 9.7 | 272 | 53.7 | 403 |
| C | 6 | 3 | 73 | 23.0 | 1.9 | 266 | 53.5 | 368 |
| D | 9 | 2 | 73 | 18.0 | 1.4 | 255 | 51.3 | 400 | monomer was 3.5 grams of n-butyl trifluorovinyl ether, added to the solvent prior to charging to the autoclave. The concentrations of tetrafluoroethylene was 68 mole percent (gas phase) of the tetrafluoroethylene-ethylene mixture. The weight of dry polymer from the run was 66.6 grams. It had a melt viscosity of 25.2×10⁴ poises at 300° C. and a melting point of 265° C. (DTA peak). The tensile strength and ultimate elongation at 200° C. were 45.1 kg./cm.² and 286 percent, respectively.

EXAMPLES XV TO XXIII

These experiments were carried out in a 1 liter, stainless steel, stirred autoclave. The temperature of the autoclave was maintained at 0° C. in all of the runs by circulating refrigerated brine through the jacket of the autoclave.

The experimental procedure was as follows: The autoclave was evacuated and purged three times with nitrogen. Then, 500 ml. of 1,1,2-trichloro-1,2,2-trifluoroethane ("Freon" 113) along with termonomer, if any, and desired amount of chloroform, for molecular weight control, were sucked into the clave. The agitator was turned on and set at 1,000 r.p.m. The clave was pressured to 3.5 kg./cm.² gauge with $N_2$ and vented to atmospheric pressure 3 times to remove any dissolved air from the F-113. The clave was cooled to 0° C. and the desired amounts of chlorotrifluoroethylene and ethylene were charged. Then, a solution of trichloroacetyl peroxide (TCAP) in F-113 (0.02 g./ml.) was charged to the clave. The polymerization was allowed to proceed until the pressure dropped 1.05-1.4 kg./cm². The polymer slurry was discharged from the clave and filtered on a coarse, sintered glass funnel. The filter cake was washed 2 times in a blender with about 500 ml. of F-113. The filter cake from the final wash was broken up and dried in a vacuum oven with $N_2$ purge at 100°-125° C. overnight. A summary of polymerization conditions and results is shown in table III.

The melt viscosities of the polymers were measured at 260° C. at a shear stress of 0.455 kg./cm.². Films were compression molded in a press at 250°-260° C. and cooled under pressure. Melting points were determined in a DuPont Differential Thermal Analyzer (Model 900) at a heating rate of 15° C./min. The minimum of the curve was used as the melting point. The composition of the polymers was determined by carbon, hydrogen, and chlorine analysis. The terpolymer contents were not measured directly but incorporation of the termonomer was indicated by a lowered melting point or infrared absorbance band. The presence of termonomer in example XX was confirmed by its infrared spectrum. The OH group in the termonomer gave rise to a band at 3,600 cm.⁻¹ in the spectrum of the terpolymer. Tensile properties were determined according to ASTM Procedure D-1457 on microtensile specimens cut from the compression molded films.

The properties of the copolymers prepared according to the conditions in table III are shown in Table IV. The properties of typical CTFE/ethylene copolymers with melt viscosities (260° C.) of 6.5 to 44.6×10⁴ poise are found in examples XV-XVII. It can be seen that the ultimate elongations at 200° C. of these copolymers are all substantially below 100 percent. On the other hand, the terpolymers in examples XVII-XXIII, which are in the same melt viscosity range, have ultimate elongations at 200° C. of 170 to 370 percent. The terpolymers have similar ultimate elongations to that of the copolymer at room temperature (150-200 percent). However, the yield strength of the terpolymers at room temperature is somewhat higher than that of the copolymer.

TABLE III.—PREPARATION OF ETHYLENE/CHLOROTRIFLUOROETHYLENE COPOLYMERS

| Example | F-113, milliliters | CTFE, grams | Ethylene, grams | Chloroform, milliliters | Termonomer Name | Termonomer Grams | TCAP, grams | Temperature, ° C. | Pressure, kg./cm. guage Initial | Pressure, kg./cm. guage Final | Time, minutes | Polymer, grams |
|---|---|---|---|---|---|---|---|---|---|---|---|---|
| XV | 500 | 454 | 28 | 2.0 | None | | 0.5 | -1-0 | 5.2 | 4.2 | 64 | 44.2 |
| XVI | 500 | 454 | 42 | 1.5 | ...do | | 0.5 | 0-1 | 6.7 | 5.7 | 60 | 48.3 |
| XVII | 500 | 454 | 28 | 1.0 | ...do | | 0.5 | -1-2 | 4.8 | 3.4 | 95 | 63 |
| XVIII | 500 | 454 | 28 | 2.0 | A | 133 | 0.5 | 0-2 | 4.3 | 3.1 | 100 | 60 |
| XIX | 500 | 454 | 42 | 1.5 | A | 133 | 0.5 | 0-1 | 6.9 | 5.8 | 127 | 74.2 |
| XX | 500 | 454 | 42 | 0.5 | B | 12 | 1.0 | 0-1 | 6.3 | 5.3 | 162 | 75.5 |
| XXI | 500 | 454 | 42 | 2.0 | C | 12 | 1.0 | -1-0 | 6.7 | 5.7 | 79 | 56.4 |
| XXII | 500 | 454 | 42 | 1.0 | C | 12 | 1.0 | 0 | 6.3 | 5.4 | 84 | 50.5 |
| XXIII | 500 | 454 | 42 | 0.5 | C | 12 | 1.0 | 0 | 6.7 | 15.7 | 62 | 50.2 |

NOTE.—A = Perfluoropropyl perfluorovinyl ether; B = 1,1,1-trifluoro-2-(trifluoromethyl)-4-penten-2-ol; and C = Allyl heptafluoroisopropyl ether.

TABLE IV.—PROPERTIES OF ETHYLENE/CHLOROTRIFLUOROETHYLENE COPOLYMERS

| Example | Analysis, percent C | Analysis, percent H | Analysis, percent Cl | CTFE, m percent ¹ | Melt viscosity ×10⁻⁴ poise (260° C.) | Melting point, ° C. (DTA peak) | Room temperature Yield strength, kg./cm.² | Room temperature Ultimate strength, kg./cm.² | Room temperature Ultimate elongation, percent | 200° C. Yield strength, kg./cm.² | 200° C. Ultimate strength, kg./cm.² | 200° C. Ultimate elongation, percent |
|---|---|---|---|---|---|---|---|---|---|---|---|---|
| XV | 33.0 | 2.7 | | 50.5 | 6.5 | 235 | 300 | 435 | 172 | 18.7 | 18.7 | 24 |
| XVI | 33.3 | 3.0 | | 49.8 | 20.9 | 240 | 289 | 372 | 113 | 16.8 | 16.8 | 31 |
| XVII | 32.2 | 2.5 | 24.6 | 52.6 | 44.6 | 235 | 293 | 415 | 160 | 16.5 | 16.5 | 55 |
| XVIII | 33.5 | 3.1 | 24.4 | | 7.3 | 228 | 320 | 470 | 187 | 13.9 | 13.1 | 159 |
| XIX | 32.2 | 2.6 | 22.5 | | 23.2 | 232 | 303 | 479 | 171 | 17.1 | 17.7 | 230 |
| XX | 33.5 | 3.0 | | | 18.8 | 234 | 330 | 460 | 155 | 17.7 | 17.9 | 278 |
| XXI | 33.2 | 2.7 | | | 7.6 | 226 | 328 | 388 | 149 | 14.2 | 13.1 | 174 |
| XXII | 33.6 | 2.8 | | | 32 | 226 | 310 | 405 | 157 | 15.6 | 19.2 | 330 |
| XXIII | 33.8 | 2.8 | | | 71 | 226 | 334 | 500 | 192 | 13.8 | 21.5 | 369 |

¹ Mole percent $CTFE = \dfrac{31.6\,(85.76 - \text{percent C})}{\text{percent C}}$: Formula applicable for CTFE/ETH copolymers only.

As many apparently widely different embodiments of this invention may be made without departing from the spirit and scope thereof, it is to be understood that this invention is not limited to the specific embodiments thereof except as defined in the appended claims.

I claim:

1. A copolymer consisting essentially of from 40 to 60 mole percent of ethylene, 40 to 60 mole percent of tetrafluoroethylene and from 0.1 to 10 mole percent of a copolymerizable vinyl monomer which is free of telogenic activity and which provides a side chain having at least two carbon atoms, said side chain being aromatic or having its elements bonded together by single bonds only.

2. The copolymer of claim 1 wherein from 45 to 55 mole percent of ethylene and 45 to 65 mole percent of tetrafluoroethylene are present.

3. The copolymer of claim 1 wherein said vinyl monomer is perfluoro(alkyl vinyl ether) wherein the alkyl group contains from 2 to 8 carbon atoms.

4. The copolymer of claim 1 having a melt viscosity of at least $5 \times 10^3$ poises at 300° C.

5. A copolymer consisting essentially of from 40 to 60 mole percent of ethylene, from 40 to 60 mole percent of either tetrafluoroethylene or chlorotrifluoroethylene and from 0.1 to 10 mole percent based on the total moles of ethylene plus tetrafluoroethylene or chlorotrifluoroethylene of a copolymerizable vinyl monomer having a side chain of at least two carbon atoms, said side chain being aromatic or having its elements bonded together by single bonds only.

6. The copolymer of claim 5 of ethylene, chlorotrifluoroethylene and said vinyl monomer.

7. The copolymer of claim 6 having a melt viscosity of at least $5 \times 10^3$ poises at 260° C.

8. The copolymer of claim 1 wherein said vinyl monomer is represented by the formula $R-CF=CF_2$, wherein R is an organic group containing 2 to 8 carbon atoms.

9. The copolymer of claim 1 wherein said vinyl monomer is represented by the formula $ROCF=CF_2$, wherein R is an organic group containing 2 to 8 carbon atoms.

10. The copolymer of claim 1 wherein said vinyl monomer is a fluorinated alpha-monoolefin.

11. The copolymer of claim 1 wherein said vinyl monomer is represented by the formula $CF_3(CF_2)_mCH_2OCF=CF_2$, wherein m is an integer of 0 to 6.

12. The copolymer of claim 1 wherein said vinyl monomer is represented by the formula $CH_3(CH_2)_nOCF\ CF_2$, wherein n is an integer of 1 to 7.

13. The copolymer of claim 1 wherein said vinyl monomer is represented by the formula $R'CH_2C(X)=CH_2$, wherein R' is a perfluorinated or chloro-fluoroalkyl group of 1 to 7 carbon atoms or a secondary or tertiary halo-alcohol group and X is H or $CH_3$.

14. The copolymer of claim 1 wherein said vinyl monomer is represented by the formula $R^2OCH_2C(X)=CH_2$, wherein $R^2$ is a perfluorinated or chloro-fluoroalkyl of 1 to 7 carbon atoms and X is H or $CH_3$.

15. The copolymer of claim 6 wherein said vinyl monomer is represented by the formula $R-CF=CF_2$, wherein R is an organic group containing 2 to 8 carbon atoms.

16. The copolymer of claim 6 wherein said vinyl monomer is represented by the formula $ROCF=CF_2$, wherein R is an organic group containing 2 to 8 carbon atoms.

17. The copolymer of claim 6 wherein said vinyl monomer is a fluorinated alpha-monoolefin.

18. The copolymer of claim 6 wherein said vinyl monomer is represented by the formula $CF_3(CF_2)_mCH_2OCF=CF_2$, wherein m is an integer of 1 to 6.

19. The copolymer of claim 6 wherein said vinyl monomer is represented by the formula $CH_3(CH_2)_nOCF=CF_2$, wherein n is an integer of 1 to 7.

20. The copolymer of claim 6 wherein said vinyl monomer is represented by the formula $R'CH_2C(X)=CH_2$, wherein R' is a perfluorinated or chloro-fluoroalkyl group of 1 to 7 carbon atoms or a secondary or tertiary halo-alcohol group and X is H or $CH_3$.

21. The copolymer of claim 6 wherein said vinyl monomer is represented by the formula $R^2OCH_2C(X)=CH_2$, wherein $R^2$ is a perfluorinated or chloro-fluoroalkyl of 1 to 7 carbon atoms and X is H or $CH_3$.

* * * * *

PO-1050
(5/69)

UNITED STATES PATENT OFFICE
CERTIFICATE OF CORRECTION

Patent No. 3,624,250      Dated November 30, 1971

Inventor(s)      Dana Peter Carlson

It is certified that error appears in the above-identified patent and that said Letters Patent are hereby corrected as shown below:

Column 1, line 62, "5 x 103 poises" should read -- $5 \times 10^3$ poises --; line 65, "5 x 106 poises" should read -- $5 \times 10^6$ poises --. Column 2, line 9, "said" should read -- side --; line 47, the formula "$CF_3(CF_2)m\ CH_2OCF=CF_2$" should read -- $CF_3(CF_2)_m\ CH_2OCF=CF_2$ --; line 48, the formula "$CH_3(CH_2)BnOCF=CF_2$" should read -- $CH_3(CH_2)_nOCF=CF_2$ --; line 68, "$AlCl_3$" should read -- $AlCl_3$ --; line 75, "$CF_3CF_3CF_2$-" should read -- $CF_3CF_2CF_2$- --. Column 3, line 7, close parenthesis after "chlorodifluoromethyl"; line 57, "biases" should read -- basis --. Column 4, line 5, "bring" should read -- bringing --. Column 5, line 8, after "60" insert -- minutes.--. Column 8, line 38, "XVII" should -- XVIII --. Claim 12, that portion of the formula reading "CF $CF_2$" should read -- $CF=CF_2$ --.

Signed and sealed this 6th day of June 1972.

(SEAL)
Attest:

EDWARD M. FLETCHER, JR.
Attesting Officer

ROBERT GOTTSCHALK
Commissioner of Patents